United States Patent Office 3,530,119
Patented Sept. 22, 1970

3,530,119
STYRYL BENZOXAZOLES
Erich Schinzel, Frankfurt am Main, Rolf Austrup, Bad Soden, Taunus, and Karl Heinz Lebkücher, Hofheim, Taunus, Germany, assignors to Farbwerke Hoechst Aktiengesellschaft vormals Meister Lucius & Brüning, Frankfurt am Main, Germany, a corporation of Germany
No Drawing. Filed June 7, 1963, Ser. No. 286,164
Claims priority, application Germany, June 9, 1962,
F 37,032
Int. Cl. C07d 85/48
U.S. Cl. 260—240         3 Claims

ABSTRACT OF THE DISCLOSURE

Cyanstyryl benzoxazoles of the formula

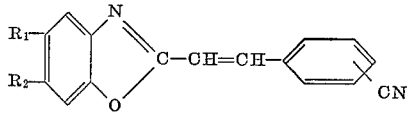

in which $R_1$ is hydrogen, lower alkyl, lower alkoxy or chlorine and $R_2$ is lower alkyl, lower alkoxy or chlorine. These compounds are useful as optical brighteners for synthetic fibers.

---

It is already known to use the derivatives of benzoxazole as optical brighteners. German Pat. No. 1,040,555 describes, for example, a process for the manufacture of α,β-di-(benzoxazolyl-(2))-ethylenes which are suitable for the brightening of man-made fibers, for example, fibers of cellulose acetate, particularly acetate silk, of polyacrylonitrile, polyesters or polyvinyl chloride.

Now, we have found that colorless or nearly colorless fluorescent benzoxazole compounds which correspond to the general formula

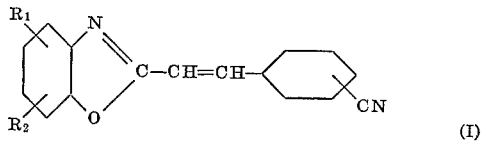

(I)

can be used as optical brighteners with excellent results. In the afore-mentioned Formula I the radicals $R_1$ and $R_2$ each may represent hydrogen, an alkyl group, an alkoxy group, an aryl group, a halogen atom, or $R_1$ and $R_2$ together may represent an annulated benzene nucleus. As alkyl radicals—also for the alkoxy groups—there may advantageously be used low molecular radicals containing at most 4 carbon atoms, for example, methyl, ethyl, tert. butyl, methoxy and ethoxy groups.

When used for the brightening of fibrous materials, particularly of those made of polyesters of the type of polyethylene glycol terephthalate, polyamide and acetylated cellulose, the new compounds are distinguished by an excellent fluorescence capacity and a very good fastness to light.

The benzoxazoles of the general Formula I, used as brighteners according to the process of the present invention, can be prepared in various ways, for example, by reacting o-amino-phenols or o-amino-naphthols with the acid chlorides of 2-, 3- or 4-cyancinnamic acid and by subsequently heating the N-acyl compounds thus obtained in an inert gas atmosphere to temperatures of 150° C. to 300° C., the oxazole ring being closed with the separation of water. It is also possible to react the 2-, 3- or 4-cyancinnamic acids directly with the o-aminophenols or o-aminonaphthols to yield the oxazole compounds, if the components are heated in known manner in the presence of an acid catalyst, such for example as boric acid, in an inert organic solvent until the separation of water is terminated.

As o-amino-phenols or o-amino-naphthols there may be mentioned: o-amino-phenol, 3 - amino-4-oxytoluene, 3-amino - 2-oxytoluene, 4-amino-3-oxytoluene, 5-amino-4-oxy - 1,2-xylene, 5-amino-4-oxy-1,3-xylene, 6-chloro-4-amino - 3-oxytoluene, 3-amino-4-oxyanisole, 3-amino-4-oxydiphenyl, 4-chloro-2-amino-phenol, 5-chloro-2-amino-phenol, 1-amino-2-naphthol and 2-amino-1-naphthol.

The brighteners of the present invention can be used in a manner known as such either in the form of solutions in water or in organic solvents or in the form of dispersions, if desired with the aid of dispersing agents. The quantities required which may vary within a wide scope can be easily detected in preliminary examinations. The compounds can also be used together with chemical bleaching agents, for example oxidative or reductive ones, for example sodium chlorite and sodium dithionite.

The compounds of the present invention can, furthermore, be added to the commercial detergents in order to improve the material to be washed.

The compounds of the invention can also be added to spinning or casting solutions which are used for the manufacture of man-made fibers, filaments, films or other structures.

The following examples serve to illustrate the invention, but they are not intended to limit it thereto:

EXAMPLE 1

A fabric of polyethylene glycol terephthalate filaments, bleached in usual manner, exhibiting a slight yellow tint, is treated for 30 minutes with an aqueous dispersion of 0.04% strength of the compound

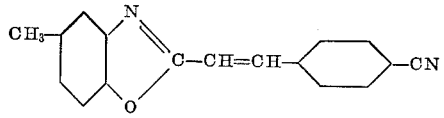

(II)

at 95° C. to 98° C. at a goods-to-liquor ratio of 1:20. After the treatment the fabric shows an excellent white tint which is not considerably weakened even when exposed for 20 hours to the light of a xenon high-pressure lamp.

The dispersion is prepared as follows:
0.1 gram of 2-(4'-cyanstyryl)-5-methylbenzoxazole of the Formula II is dissolved in 5 milliliters of dimethyl formamide and mixed with 1.2 grams of alkyl phenol polyglycol ether (average degree of oxylation 23 mols of ethylene oxide). The solution is then introduced into 250 milliliters of water at 20° C.

The 2 - (4'-cyanstyryl)-5-methyl-benzoxazole of the Formula II can be prepared according to the following method:

A suspension of 10.6 parts by weight of 4-cyancinnamic acid chloride melting at 102° C. in 20 parts by volume of acetone is introduced in small portions at 30° C. to 35° C. into a thoroughly stirred mixture of 6.2 parts by weight of 3-amino-4-oxytoluene, 50 parts by volume of water and 20 parts by volume of acetone; by simultaneously adding dropwise 2 N-sodium hydroxide solution the reaction mixture is always kept neutral to weakly alkaline. While maintaining the neutral reaction, stirring is continued for a further 5 hours at 30° C. to 35° C., the precipitated reaction product is filtered with suction and washed with water until it is free from chlorine ions. In order to purify the reaction product, it is thoroughly stirred with about 100 parts by volume of 1 N-hydrochloric acid, filtered with suction and washed again until it is free from chlorine ions. After drying at 60° C. in vacuo, the 4-cyancinnamic acid amide of the 3-amino-4-oxytoluene melts at 246° C.–247° C. (with evolution of gas).

In order to convert the dried 4-cyancinnamic acid amide into the benzoxazole compound it is caused to melt on the oil bath in a flask, provided with a gas inlet tube and a descending cooler, while nitrogen is conducted through the flask. It is subsequently heated for 1 hour at 225° C. to 230° C. until the separation of water is terminated. The melt which crystallizes on cooling is comminuted mechanically and purified by dissolving it and allowing it to crystallize from butanol. The so obtained 2-(4'-cyanstyryl)-5-methyl-benzoxazole melting at 200° C. to 202° C. is a weakly yellow tinted compound which in a dilute dioxane solution exhibits an intense reddish blue flourescence.

Instead of the 2-(4'-cyanstyryl)-5-methyl-benzoxazole of the Formula II there may be used the following compounds in an analogous manner:

| Compound: | Melting point, ° C. |
|---|---|
| 2-(4'-cyanstyryl)-7-methyl-benzoxazole | 162–163 |
| 2-(4'-cyanstyryl) - 5,6 - dimethyl-benzoxazole | 198–200 |
| 2-(4'-cyanstyryl) - 5 - chloro - 6 - methyl-benzoxazole | 218–219 |
| 2-(4'-cyanstyryl)-5-phenyl-benzoxazole | 186 |
| 2-(4'-cyanstyryl)-5-chloro-benzoxazole | 226–228 |
| 2-(3'-cyanstyryl)-5-methyl-benzoxazole | 165–166 |
| 2-(3'-cyanstyryl) - 5,6 - dimethyl-benzoxazole | 192–194 |
| 2-(3'-cyanstyryl)-5-chloro-6-methyl - benzoxazole | 192–193 |
| 2-(3'-cyanstyryl) - 5 - methoxy - benzoxazole | 160–162 |
| 2-(3'-cyanstyryl)-5-phenyl-benzoxazole | 162–164 |
| 2(3'-cyanstyryl)-naphth-(1,2)-oxazole | 158–160 |
| 2-(3'-cyanstyryl)-naphth-(2,1)-oxazole | 153–154 |
| 2-(4'-cyanstyryl) - 5 - tert.butyl - benzoxazole | 154–155 |
| 2-(4'-cyanstyryl)-benzoxazole | 202–203 |
| 2-(4'-cyanstyryl) - 5,7 - dimethyl-benzoxazole | 207–208 |
| 2-(4'-cyanstyryl)-naphth-(1,2)-oxazole | 200–202 |
| 2-(4'-cyanstyryl)-naphth-(2,1)-oxazole | 194–195 |
| 2-(3'-cyanstyryl) - 5,7 - dimethyl-benzoxazole | 169–170 |
| 2-(2'-cyanstyryl)-5-methyl-benzoxazole | 157–158 |
| 2-(2'-cyanstyryl) - 5,6 - dimethyl-benzoxazole | 202–204 |
| 2-(2'-cyanstyryl) - 5,7 - dimethyl-benzoxazole | 150–153 |
| 2-(2' - cyanstyryl)-5-chloro-6-methyl-benzoxazole | 200–202 |
| 2-(2'-cyanstyryl)-5-phenyl-benzoxazole | 153–154 |
| 2-(2'-cyanstyryl)-5-chloro-benzoxazole | 162–165 |

EXAMPLE 2

5 grams of a fabric of polycaprolactam filaments, which still exhibits a weakly yellow tint though chemically bleached, are treated for 30 minutes at 60° C. with 100 milliliters of an aqueous dispersion of 0.02% strength of the compound

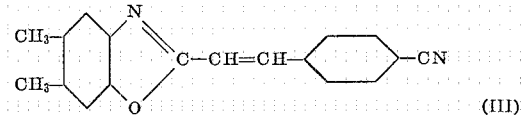

After the treatment the fabric exhibits a brilliant white tint which cannot be obtained by a chemical bleaching process only.

Instead of the 2-(4'-cyanstyryl)-5,6-dimethyl-benzoxazole there may also be used the compound mentioned in Example 1.

EXAMPLE 3

A crude fabric of polycaprolactam filaments is treated for 30 minutes at 65° C. at a goods-to-liquor ratio of 1:20 in a bath containing per liter 0.4 gram of the compound

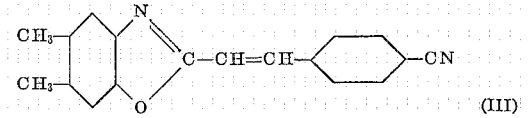

2 grams of sodium dithionite and 1 gram of sodium pyrophosphate. The treated fabric exhibits a brilliant white tint which cannot be obtained by a chemical bleaching process only.

EXAMPLE 4

A crude fabric of polyethylene glycol terephthalate filaments was bleached for 60 minutes at 95° C. at a goods-to-liquor ratio of 1:20 and a pH value of 3.5 in a bath containing per liter 0.4 gram of the compound

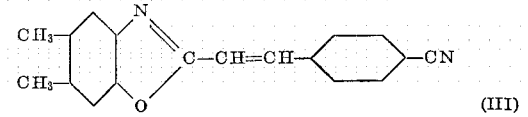

and 0.5 gram of sodium chlorite of 100% strength. The treated fabric showed a brilliant clear white tint.

We claim:
1. 2-(4'-cyanstyryl)-5-chloro-6-methyl-benzoxazole.
2. 2-(3'-cyanstyryl)-5-chloro-6-methyl-benzoxazole.
3. 2-(2'-cyanstyryl)-5-chloro-6-methyl-benzoxazole.

References Cited

UNITED STATES PATENTS

| 2,842,545 | 7/1958 | Duennenberger et al. | 260—240 |
| 3,118,883 | 1/1964 | Duennenberger et al. | 260—240 |
| 3,262,929 | 7/1966 | Akubo et al. | 260—240 |
| 3,158,610 | 11/1964 | Buell | 260—240 |

FOREIGN PATENTS

| 348,967 | 11/1960 | Switzerland. |
| 578,303 | 6/1959 | Canada. |
| 1,248,230 | 10/1960 | France. |
| 1,336,949 | 7/1963 | France. |

OTHER REFERENCES

Chemical Abstracts, vol. 58, cols. 9049 to 9050 (April 1963).

Kendal General Chemistry, pp. 22–23, D. Appleton Century Co. (N.Y.) 1936.

JOHN D. RANDOLPH, Primary Examiner

U.S. Cl. X.R.

117—33.5; 260—465; 252—301.2, 186, 188, 152, 98